United States Patent
Bi et al.

(10) Patent No.: US 11,532,302 B2
(45) Date of Patent: Dec. 20, 2022

(54) PRE-VOICE SEPARATION/RECOGNITION SYNCHRONIZATION OF TIME-BASED VOICE COLLECTIONS BASED ON DEVICE CLOCKCYCLE DIFFERENTIALS

(71) Applicant: Harman International Industries, Incorporated, Stamford, CT (US)

(72) Inventors: Xiangru Bi, Shanghai (CN); Guoxia Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 39 days.

(21) Appl. No.: 16/643,803

(22) PCT Filed: Sep. 28, 2017

(86) PCT No.: PCT/CN2017/103846
§ 371 (c)(1),
(2) Date: Mar. 2, 2020

(87) PCT Pub. No.: WO2019/061117
PCT Pub. Date: Apr. 4, 2019

(65) Prior Publication Data
US 2020/0234703 A1    Jul. 23, 2020

(51) Int. Cl.
*G10L 15/22*        (2006.01)
*G10L 17/02*        (2013.01)
*G10L 21/0272*      (2013.01)

(52) U.S. Cl.
CPC .............. *G10L 15/22* (2013.01); *G10L 17/02* (2013.01); *G10L 21/0272* (2013.01)

(58) Field of Classification Search
CPC ..... G10L 15/22; G10L 17/02; G10L 21/0272; G10L 2021/02166; G10L 15/00; H04R 3/005
See application file for complete search history.

(56) References Cited

U.S. PATENT DOCUMENTS 9,570,071 B1 *   2/2017  Hart ................. G10L 15/30
2009/0238377 A1  9/2009  Ramakrishnan et al.
(Continued)

FOREIGN PATENT DOCUMENTS

| CN | 104637492 A | 5/2015 |
| CN | 105590624 A | 5/2016 |
| WO | 2015157013 A1 | 10/2015 |

OTHER PUBLICATIONS

ISA State Intellectual Property Office of the People's Republic of China, International Search Report Issued in Application No. PCT/CN2017/103846, dated May 31, 2018, 9 pages.
(Continued)

*Primary Examiner* — Michael N Opsasnick
(74) *Attorney, Agent, or Firm* — McCoy Russell LLP

(57) ABSTRACT

Methods and devices for conducting, based on a clock difference, a synchronization process on voice information collected by a plurality of voice collection devices. Then, after the synchronization process is performed on the voice information collected by the plurality of voice collection devices, conducting a voice separation and recognition process on voice information that was collected by the plurality of voice collection devices and synchronized based on the clock difference among the plurality of voice collection devices.

16 Claims, 4 Drawing Sheets

(56) References Cited

U.S. PATENT DOCUMENTS

| | | |
|---|---|---|
| 2015/0127338 A1 | 5/2015 | Reuter |
| 2015/0264480 A1 | 9/2015 | Talwar et al. |
| 2016/0133252 A1* | 5/2016 | Bang .................... H04R 1/1083 |
| | | 704/233 |
| 2018/0210703 A1* | 7/2018 | Meyers .................... G10L 15/00 |
| 2019/0090056 A1* | 3/2019 | Rexach .................... G06F 3/167 |
| 2020/0117416 A1* | 4/2020 | Vega Zayas ......... H04N 21/439 |
| 2020/0396542 A1* | 12/2020 | Beckhardt .......... H04N 21/4307 |

OTHER PUBLICATIONS

Sakanashi, R. et al., "Speech enhancement with ad-hoc microphone array using single source activity," Proceedings of the 2013 Asia-Pacific Signal and Information Processing Association Annual Summit and Conference, Oct. 29, 2013, Kaohsiung, Taiwan, 6 pages.
Cherkassky, D. et al., "Blind Synchronization in Wireless Acoustic Sensor Networks," IEEE/ACM Transactions on Audio, Speech, and Language Processing, vol. 25, No. 3, Mar. 2017, 11 pages.
European Patent Office, Extended European Search Report Issued in Application No. 17927221.6, dated Apr. 13, 2021, Germany, 10 pages.

\* cited by examiner

PRE-VOICE SEPARATION/RECOGNITION SYNCHRONIZATION OF TIME-BASED VOICE COLLECTIONS BASED ON DEVICE CLOCKCYCLE DIFFERENTIALS

CROSS-REFERENCE TO RELATED APPLICATIONS

The present application is a U.S. National Phase of International Application No. PCT/CN2017/103846, entitled "METHOD AND DEVICE FOR VOICE RECOGNITION", and filed on Sep. 28, 2017. The entire contents of the above-listed application are hereby incorporated by reference for all purposes.

FIELD

The present disclosure generally relates to a method and device for voice recognition.

Nowadays, voice control is applied in more and more fields, for example, in the field of vehicles. Voice recognition logic is a typical element to achieve voice control. A typical vehicle may have one microphone. When there are two or more speakers speaking at the same time or there is a noise in the vehicle, the typical voice recognition logic cannot separate mixed voices effectively, which affects a voice recognition rate. Currently, one method to achieve accurate voice separation is to create a microphone array, another method is to separate mixed voices by Independent Component Analysis (ICA), Frequency Domain Independent Component Analysis (FDICA) or other extended algorithm. However, all of these methods require that the number of microphones to be at least equal to the number of voice sources, which means current vehicles should add more microphones to achieve voice separation, which however, will lead to a cost increase.

SUMMARY

In an embodiment, a method for voice recognition is provided, including: receiving voice information collected by a plurality of voice collection devices configured on a plurality of devices connected together, wherein the plurality of devices comprises at least one mobile device; and conducting a voice separation and recognition process on the voice information collected by the plurality of voice collection devices.

In some embodiments, the method further includes: determining a clock difference between one of the plurality of devices and one of the remaining of the plurality of devices.

In some embodiments, determining the clock difference between one of the plurality of devices and the remaining of the plurality of devices includes: obtaining a clock reading of each of the plurality of devices; and obtaining a clock difference between one of the plurality of devices and one of the remaining of the plurality of devices.

In some embodiments, determining the clock difference between one of the plurality of devices and one of the remaining of the plurality of devices includes: a first device sending a test message at a first time point to a second device; the first device receiving a feedback message at a third time point from the second device, wherein the feedback message at least comprises a second time point of receiving the test message and a fourth time point of sending the feedback message of the second device; and determining the clock difference between the clock of the first device and the clock of the second device based on the first time point, the second time point, the third time point and the fourth time point; wherein the first device is one of the plurality of devices, and the second device is one of the remaining of the plurality of devices.

In some embodiments, conducting the voice separation and recognition process on the voice information collected by the plurality of voice collection devices includes: synchronizing the voice information collected by the plurality of voice collection devices based on the clock difference among the plurality of devices; separating the synchronized voice information; and recognizing the separated voice information.

In some embodiments, synchronizing the voice information collected by the plurality of voice collection devices includes: synchronizing a first voice information based on a clock difference between a first device and a reference device; wherein the first voice information is collected by a first voice collection device configured on the first device; the reference device is one of the plurality of devices, and the first device is one of the remaining of the plurality of devices.

In some embodiments, the method further includes: transmitting a collection information to start a collection of voice information by the plurality of voice collection devices.

In an embodiment, a method for voice recognition is provided, including: obtaining a clock difference among a plurality of devices connected together, where each of the plurality of devices is configured with a voice collection device; obtaining voice information collected by the voice collection devices configured on the each of the plurality of devices; and conducting a voice separation and recognition process on the voice information collected by the plurality of voice collection devices based on the clock difference.

In some embodiments, obtaining the clock difference includes: obtaining a first time point for sending a test message by a first device; obtaining a second time point for receiving the test message by a second device; obtaining a third time point for receiving a feedback message by the first device; obtaining a fourth time point for sending the feedback message by the second device; and determining the clock difference between a clock of the first device and a clock of the second device based on the first time point, the second time point, the third time point and the fourth time point; wherein the first device is one of the plurality of devices, and the second device is one of the remaining of the plurality of devices.

In some embodiments, conducting the voice separation and recognition process on the voice information collected by the plurality of voice collection devices includes: synchronizing the voice information collected by the voice collection devices configured on each of the plurality of devices based on the clock difference among the plurality of devices; separating the synchronized voice information; and recognizing the separated voice information.

In an embodiment, a voice recognizing device is provided, including: a processor, configured to: obtain a clock difference among a plurality of devices connected together, where each of the plurality of devices is configured with a voice collection device; obtain voice information collected by the voice collection device configured on the each of the plurality of voice collection devices; and conduct a voice separation and recognition process on voice information collected by the voice collection device based on the clock difference among the plurality of devices.

In some embodiments, the processor determining the clock difference includes: obtaining a first time point at which a first device sends a test message to a second device;

obtaining a second time point at which the second device receives the test message; obtaining a third time point at which the first voice collecting device receives a feedback message from the second device; obtaining a fourth time point at which the second device sends the feedback message; and determining the clock difference between a clock of the first device and a clock of the second device based on the first time point, the second time point, the third time point and the fourth time point; wherein the first device is one of the plurality of devices, and the second device is one of the remaining of the plurality of devices.

In some embodiments, the processor conducts a voice separation and recognition process including: synchronizing the voice information collected by the voice collection device configured on each of the plurality of devices based on the clock difference among the plurality of devices; separating the synchronized voice information; and recognizing the separated voice information.

In some embodiments, the device further includes a voice collection circuitry configured to collect the voice information.

In some embodiments, the device further includes a connection circuitry configured to connect with a device through WIFI, Bluetooth or Infrared light.

In an embodiment, a storage medium which has computer instructions stored therein is provided, wherein once the computer instructions are executed, the above method is performed.

By applying at least one voice collection device configured on at least one mobile device for collecting voices, voice recognition rate in an application environment may be improved without adding any more fixed microphones in the application environment.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
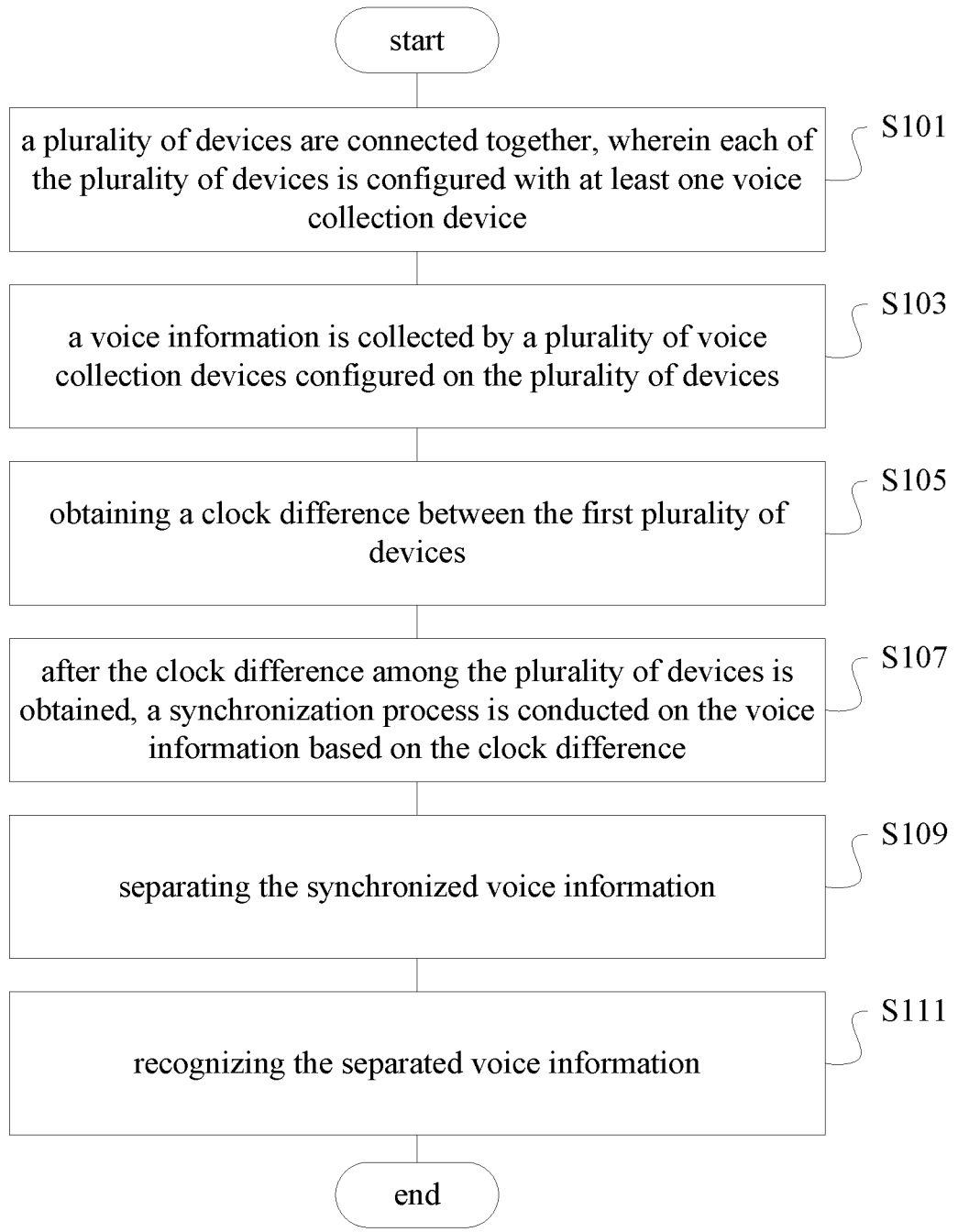
FIG. 1 schematically illustrates a flow chart of a method for voice recognition according to an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

FIG. 1 schematically illustrates a flow chart of a method for voice recognition according to an embodiment of the present disclosure, wherein the voice recognition includes speech recognition, sound recognition and/or noise recognition.

Referring to FIG. 1, in S101, a plurality of devices are connected together, wherein each of the plurality of devices is configured with at least one voice collection device.

Figure 2:
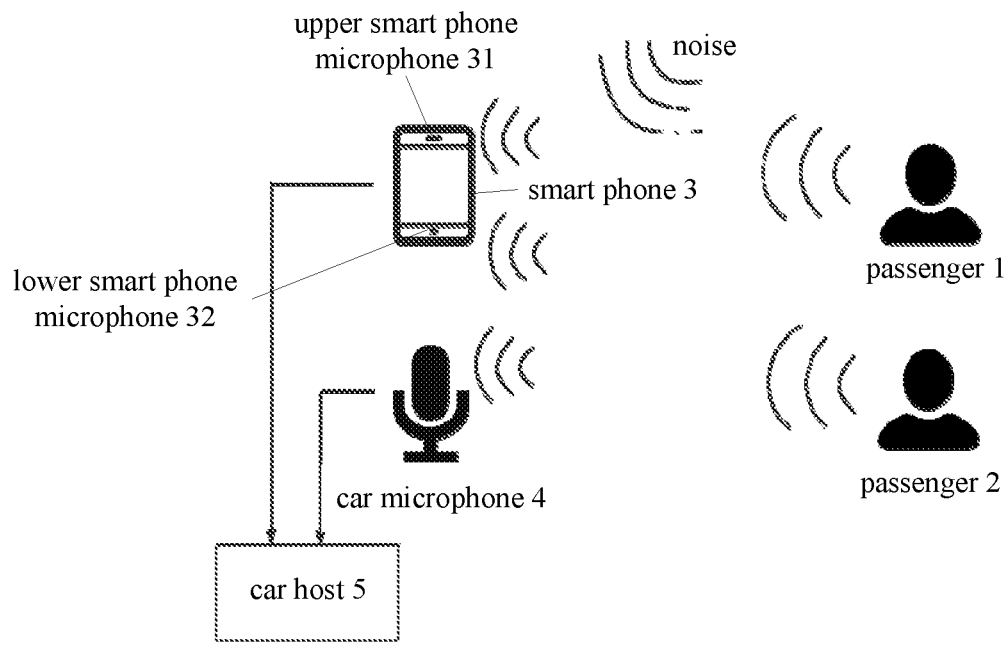
FIG. 2 schematically illustrates a scene for voice recognition according to an embodiment of the present disclosure.

For an exemplary purpose, FIG. 2 schematically illustrates a scene for voice recognition in a vehicle according to an embodiment of the present disclosure. Especially in a vehicle whose number of fixed microphones installed is less than the number of passengers the vehicle may hold. In the scene provided in FIG. 2, two passengers, passenger 1 and passenger 2 is presented in the vehicle. The vehicle is equipped with a car microphone 4 and is controlled by a car host 5. A smart phone 3, which is equipped with an upper smart phone microphone 31 and a lower smart phone microphone 32 is carried into the vehicle by one of the passengers or a driver (which is not shown in FIG. 2).

Referring to FIG. 2, the car host 5 and the smart phone 3 are connected together.

In some embodiments, the smart phone 3 is taken as an example. In some embodiments, any other mobile device equipped with a voice collection device or any other sensor that may collect surrounding sound and noise, and that may be connected to the vehicle to process data transmission may be utilized for such purpose, for example, flat computer, laptop and so on. In some embodiments, the car host 5 and the smart phone 3 may be connected at least through WIFI, BLUETOOTH, or INFRARED LIGHT.

In some embodiments, the car host 5 and the smart phone 3 may be connected automatically or manually. In some embodiments, the connection process may be started in response to the driver's or passenger's instruction. The driver's or passenger's instruction may be received through keyboard input, speech input, gesture input, and the like.

In some embodiments, the connection process may be started automatically as soon as the driver or passenger goes into the vehicle.

In some embodiments, the connection establishment process may be initiated by the vehicle. For example, referring to FIG. 2, a smart phone 3 may be connected to a car host 5 of a vehicle as soon as it is carried into the vehicle. Alternatively, the connection establishment process may be initiated by any of the mobile devices. For example, referring to FIG. 2, when a smart phone 3 is carried into a vehicle, a connection establishment request may be sent to a car host 5 of the vehicle for connection establishment.

Referring to FIG. 1, in S103, voice information is collected by a plurality of voice collection devices configured on the plurality of devices.

Referring to FIG. 2, after the connection is established between the car host 5 and the smart phone 3, both the upper smart phone microphone 31 and a lower smart phone microphone 32 of the smart phone 3 may be ready to collect voice information in the vehicle. The car microphone 4, which is fixed on the vehicle, may also be started to collect voice information in the vehicle.

In some embodiments, the voice information collected includes, but is not limited to, the voice made by the driver or the two passengers. Noise within and out of the vehicle may also be mixed in the voice information. As a result, the voice information collected may be mixed voice information.

In some embodiments, the voice collection process may be initiated by a collection of information. The collection of information may be initiated manually or automatically after the connection is established so that each of the plurality of voice collection devices starts to collect voices. In some embodiments, the collection of information may also be initiated under a condition, such as detecting a voice by the car host 5, and the like.

In some embodiments, a recorder (which is not shown in FIG. 2) in the smart phone 3 may be used to control the collection of voices.

In some embodiments, the voice information may include moment information, which may be useful in a voice separation and recognition process. For example, the moment information may include a starting moment and a stopping moment, which is necessary to match two or more voice information recorded by different voice collection devices. The moment voice information may be recorded according to a clock of the voice collection device.

In some embodiments, the clock of the voice collection device may be based on the clock of the mobile device or the vehicle on which it is configured. For example, as to voice information collected by the smart phone 3, the clock of the smart phone 3 is the clock of the voice information. Alternatively, as to voice information collected by the car microphone 4, the clock of the vehicle is the clock of the voice information, wherein the clock of the vehicle may be the clock of the car host 5.

In practice, clocks of different devices are quite different, which will decrease the accuracy of voice recognition. Therefore, a synchronization process should be performed on the collected voice information to improve the accuracy of the voice recognition rate. For example, by performing the synchronization process, the starting moment or the stopping moment should be synchronized. However, for conducting the synchronization process, a clock difference between the voice information collected by different devices should be determined.

Referring to FIG. 1, In S105, a clock difference between the first plurality of devices is obtained. In some embodiments, the clock difference may be obtained between one of the plurality of devices and one of the remaining of the plurality of devices.

Figure 3:
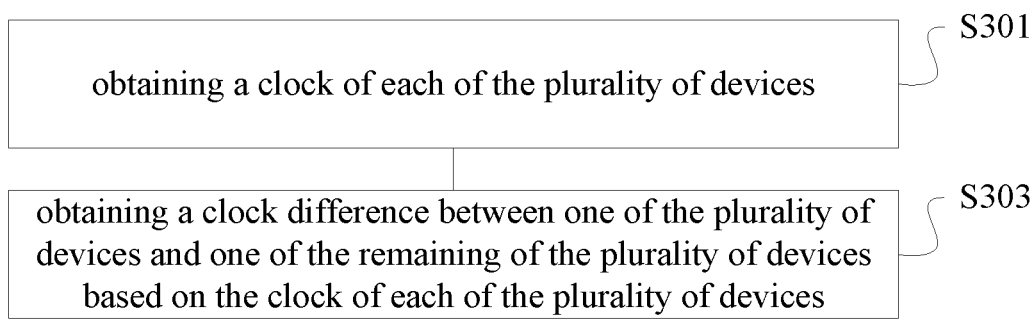
FIG. 3 schematically illustrates a flow chart of a method for determining a clock difference according to an embodiment of the present disclosure.

FIG. 3 schematically illustrates a flow chart of a method for determining a clock difference according to an embodiment of the present disclosure.

In S301, a clock of each of the plurality of devices is obtained.

Referring to FIG. 2, the car host 5 obtains the clock of the smart phone 3 and its own clock.

In some embodiments, the acquisition process may be executed automatically, or it may be executed in response to a request of the car host 5.

Referring to FIG. 3, in S303, a clock difference between one of the plurality of devices and one of the remaining of the plurality of devices based on the clock of each of the plurality of devices is obtained.

Referring to FIG. 2, after obtaining the clock of the smart phone 3, the clock difference between the smart phone 4 and the car host 5 may be determined. For example, the clock difference may be determined according to equation (1):

$$X = T_a - T_b \qquad (1)$$

wherein X represents the clock difference between the smart phone 3 and the car host 5, $T_a$ represents the clock of the smart phone 3, $T_b$ represents the clock of the car host 5.

In some embodiments, the clock difference determination process may be executed as soon as the connection process is executed.

In some embodiments, the clock difference determination process may be executed after the collection of information is received.

In some embodiments, referring to FIG. 2, in addition to the devices shown in FIG. 2, there is an iPAD (not shown in FIG. 2) also be configured to collect the voice information in the car. The clock difference between the smart phone 3 and the iPAD may be determined by the smart phone 3 (or the iPAD). Then the clock of the smart phone 3 and the clock difference between the smart phone 3 and the iPAD may be sent to the car host 5 by the smart phone 3. In some embodiments, the clock difference between the smart phone 3 and the iPAD, the clock difference between the smart phone 3 and the car host 5, and the clock difference between the iPAD and the car host 5 may all be determined by the car host 5.

Figure 4:
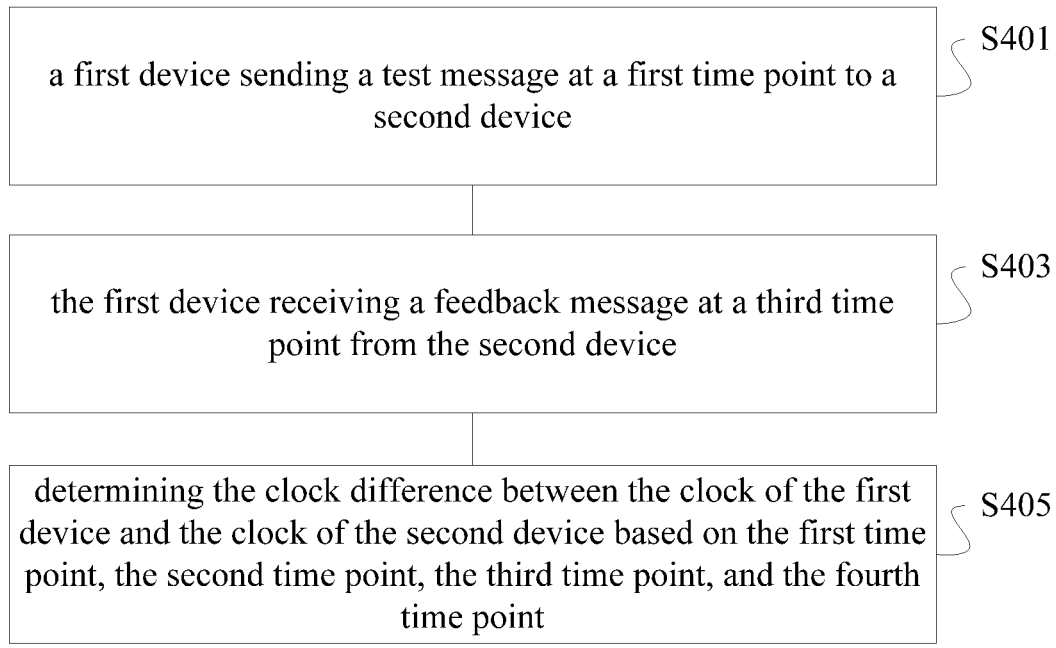
FIG. 4 schematically illustrates a flow chart of a method for determining a clock difference according to another embodiment of the present disclosure.

FIG. 4 schematically illustrates a flow chart of a method for determining a clock difference according to another embodiment of the present disclosure.

In S401, a first device sends a test message at a first time point to a second device.

Referring to FIG. 2, once the connection is established, a test message is sent to the smart phone 3 by the car host 5. In some embodiments, a connection establishment request and a first time point of sending the test message may be included in the test message.

Referring to FIG. 4, in S403, the first device receives a feedback message at a third time point from the second device.

Referring to FIG. 2, in response to the test message, a feedback message is sent to the car host 5 by the smart phone 3. In some embodiments, a second time point of receiving the test message and a fourth time point of sending the feedback message may be included in the feedback message. In some embodiments, a connection establishment success response may also be included in the feedback message.

In some embodiments, a third time point of receiving the feedback message may be recorded by the car host 5.

Referring to FIG. 4, in S405, the clock difference between the clock of the first device and the clock of the second device based on the first time point, the second time point, the third time point and the fourth time point is determined.

Figure 5:
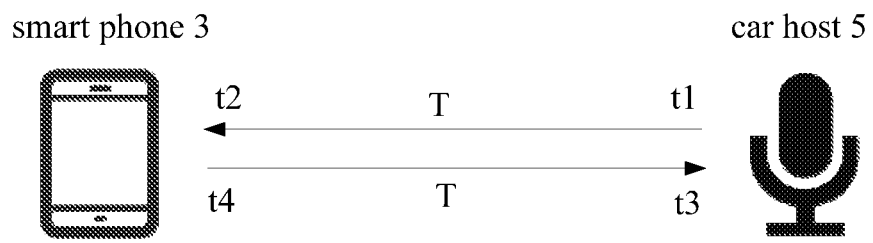
FIG. 5 schematically illustrates a scene for determining a clock difference according to an embodiment of the present disclosure.

In some embodiments, assuming that the clock of the smart phone 3 is X earlier than the clock of the car host 5 in minutes. As shown in FIG. 5, after the test message and the feedback message are transmitted, the following equations (2) may be obtained:

$$\begin{cases} t1 + T = t2 - X \\ t4 + T = t3 + X \end{cases} \qquad (2)$$

wherein T refers to data transmission time between the smart phone 3 and the car host 5.

As a result, the clock difference may be determined according to equation (3):

$$X=[(t4-t3)-(t1-t2)]/2 \quad (3)$$

wherein X represents the clock difference between the clock of the smart phone 3 and the clock of the car host 5, t1 represents the first time point of sending the test message by the car host 5, t2 represents the second time point of receiving the test message by the smart phone 3, t3 represents the third time point of receiving the feedback message by the car host 5, and t4 represents the fourth time point of sending the feedback message by the smart phone 3.

In some embodiments, if the value of the X calculated from the equation (3) is positive, it may be determined that the clock of the smart phone 3 is X minutes earlier than the clock of the car host 5. In this situation, the starting moment and the stopping moment of the voice information collected by the upper smart phone microphone 31 and the lower smart phone microphone 32 of the smart phone 3 is X minutes earlier than that collected by the car microphone 4 of the vehicle, even though the upper smart phone microphone 31, the lower smart phone microphone 32 and the car microphone 4 response to a voice collection of information at the same time.

Otherwise, if the value of the X calculated from the equation (3) is negative, it may be determined that the clock of the smart phone 3 is X minutes later than the clock of the car host 5. In this situation, the starting moment and the stopping moment of the voice information collected by the upper smart phone microphone 31 and the lower smart phone microphone 32 of the smart phone 3 is X minutes later than that collected by the car microphone 4 of the vehicle, even though the upper smart phone microphone 31, the lower smart phone microphone 32 and the car microphone 4 response to a voice collection of information at the same time.

In the above embodiment, the clock difference is determined by the car host 5 when the clock of the car host 5 is regarded as a reference clock, wherein the car host 5 may be regarded as a reference device. In some embodiments, the clock difference may also be determined by the smart phone 3 when the clock of the smart phone 3 is regarded as a reference clock, wherein the smart phone 3 may be regarded as a reference device. In some embodiments, the clock difference determination process may even be conducted on a third platform when the clock of the third platform is regarded as a reference clock.

Referring to FIG. 1, in S107, after the clock difference among the plurality of devices is obtained, a synchronization process is conducted on the voice information based on the clock difference.

The synchronization process may be conducted on a reference clock, which is different from clocks of all of the plurality of devices in the vehicle. For example, the reference clock may be a standard time of a time zone where the vehicle is located in. The location of the vehicle may be determined by a locating device fixed on the vehicle, or may be determined by the locating device configured on a mobile device in the vehicle. The locating device may include GPS or other devices with a locating function. In some embodiments, one clock of the plurality of devices may act as the reference clock. For example, referring to FIG. 2, the reference clock may be the clock of the car host 5 or the smart phone 3.

Referring to FIG. 2, the synchronization process includes: synchronizing the voice information collected by the smart phone 3 and the car microphone 4 based on the clock difference between the clock of the smart phone 3 and the clock of the car host 5. The voice information collected by the smart phone 3 is collected by the upper smart phone microphone 31 and the lower smart phone microphone 32. Herein, the clock of the car host 5 is regarded as the reference clock. The synchronized voice information of the smart phone 3 may be obtained according to equation (3):

$$T1'=T1+X \quad (3)$$

wherein T1' represents the synchronized voice information, T1 represents the voice information collected by the smart phone 3, X represents the clock difference between the clock of the smart phone 3 and the clock of the car host 5.

Referring to FIG. 1, in S109, separating the synchronized voice information.

Those skilled in the art may understand that, during the voice separation process, the number of voice collection devices is required to be no less than the number of voice sources. By applying at least one voice collection device configured on at least one mobile device for collecting voice, the requirement of the number of voice collection devices is met without adding any more fixed microphones in the vehicle and the voice recognition rate is improved.

Referring to FIG. 2, in response to the collection of information, the upper smart phone microphone 31 and the lower smart phone microphone 32 of the smart phone 3 starts to collect voices. At the same time, the car microphone 4 also starts to collect voices. When a collection period expires, a first voice information is generated by the upper smart phone microphone 31 and the lower smart phone microphone 32, and a second voice information is generated by the car microphone 4. After receiving the first voice information sent by the smart phone 3 and the second voice information sent by the car microphone 4, the car host 5 may conduct synchronization process on the clock difference between the clock of the car host 5 and the clock of the smart phone 3.

After the synchronization process is performed, the car host 5 may further conduct a separation process on the synchronized first voice information and the synchronized second voice information to separate a voice from the mixed voice. Since the number of voice collection devices is no less than the number of the passengers in the vehicle, the car host 5 may separate each passenger's voice accurately. The separated voice information is a one-to-one correspondence to the passenger in the vehicle. For example, the separated first voice information may mainly correspond to the passenger 1's voice, while the separated second voice information may mainly correspond to the passenger 2's voice.

In some embodiments, the separation process may be performed via clustering and/or statistical treatment.

In some embodiments, by using the upper smart phone microphone 31 and the lower smart phone microphone 32, a better noise reduction first voice information is obtained.

In some embodiments, the collection period may be a default. In some embodiments, the collection period may be included in the collection of information.

Referring to FIG. 1, in S111, the separated voice information is recognized.

In some embodiments, the voice separation and recognition process may be performed via Degenerate Unmixing Estimation Technique (DUET), ICA (Independent Component Analysis) method and their extended algorithm.

In some embodiments, the voice recognition process may be performed via FDICA (Frequency Domain Independent Component Analysis) method.

Referring to FIG. 2, the separation and recognition process may be conducted on the car host 5. In some embodiments, the separation and recognition process may be conducted on the smart phone 3.

In some embodiments, the separation and recognition process may even be conducted on a third platform. The synchronized voice information may be transmitted to the third platform which conducts the separation and recognition process via wired and/or wireless method. In some embodiments, the wireless transmission method may be realized by Bluetooth connection, Wi-Fi connection and the like.

Please note that once the plurality of devices are connected together, the voice collection and recognition process may be conducted for multiples times, and there is no need to connect the plurality of devices between the multiple times. However, in the multiple times of the voice collection and recognition process, the plurality of devices are in a connection state.

A voice recognizing device is also provided according to the present disclosure, which includes a processor. The processor is configured to obtain a clock difference among a plurality of devices connected together, where a plurality of voice collection devices is configured on the plurality of devices; to obtain voice information collected by the plurality of voice collection devices; and to conduct a voice separation and recognition process on voice information collected by the plurality of voice collection devices based on the clock difference.

In some embodiments, the processor determination of the clock difference includes: obtaining a clock of each of the plurality of devices; obtaining a clock difference between one of the plurality of devices and any one of the remaining of the plurality of devices based on the clock of each of the plurality of devices.

In some embodiments, the processor determination of the clock difference includes: obtaining a first time point at which a first device sends a test message to a second device; obtaining a second time point at which the second device receives the test message; obtaining a third time point at which the first voice collecting device receives a feedback message from the second device; obtaining a fourth time point at which the second device sends the feedback message; and determining the clock difference between a clock of the first device and a clock of the second device based on the first time point, the second time point, the third time point and the fourth time point; wherein the first device is one of the plurality of devices, and the second device is one of the remaining of the plurality of devices. Detailed information on obtaining clock difference of the plurality of device may be referred to in the above description of FIG. 3 and FIG. 4.

In some embodiments, the processor conducts a voice separation and recognition process including: synchronizing the voice information collected by the plurality of voice collection devices based on the clock difference among the plurality of devices; separating the synchronized voice information; and recognizing the separated voice information. Detailed information on conducting a voice separation and recognition process may be referred to in the above description of FIG. 1.

In some embodiments, the device for voice recognition further includes a voice collection circuitry configured to collect the voice information.

In some embodiments, the device for voice recognition further includes a connection circuitry configured to connect with a device through WIFI, Bluetooth or Infrared light.

Figure 6:
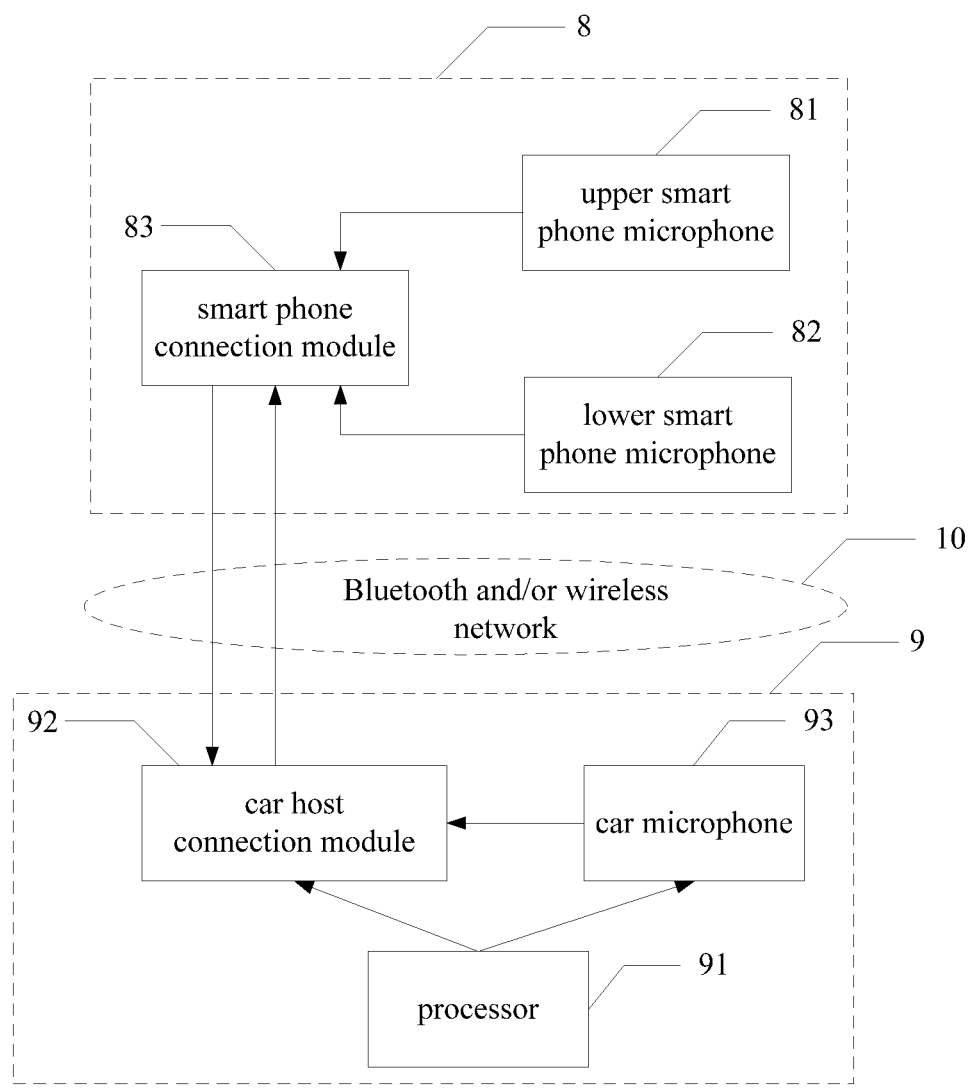
FIG. 6 schematically illustrates a system for voice recognition according to an embodiment of the present disclosure.

For an exemplary purpose, FIG. 6 schematically illustrates a system for voice recognition according to an embodiment of the present disclosure. In some embodiments, the system for voice recognition includes an upper smart phone microphone 81, a lower smart phone microphone 82, a car microphone 93 and a processor 91. In some embodiments, the system 91 further includes a connection circuitry 10 configured to connect with the smart phone 8 through WIFI, BLUETOOTH or INFRARED LIGHT. Referring to FIG. 6, the connection circuitry 10 further includes a car host connection module 92 and smart phone connection module 83, wherein the car host connection module 92 may be configured on the car host 9 and the smart phone connection module 83 may be configured on the smart phone 8. Referring to FIG. 6, the processor 91 is configured to perform the voice separation and recognition process.

In some embodiments, the processor 91 is configured to obtain a clock difference between a car host 9 and a smart phone 8.

In some embodiments, the processor 91 is configured to synchronize the voice information collected by the smart phone 8 and the car microphone 93 based on the clock difference between the clock of the smart phone 8 and the clock of the car host 9; and to separate and recognize voices made by different passengers in the vehicle. As a result, the car host 9 may respond to different orders made by different passengers through voice accurately and rapidly.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for voice recognition, comprising:
receiving voice information collected by a plurality of voice collection devices configured on a plurality of devices connected together, wherein the plurality of devices comprises at least one mobile device;
determining a clock difference between one of the plurality of devices and one of the remaining of the plurality of devices; and
conducting, based on the clock difference, a synchronization process on the voice information collected by the plurality of voice collection devices and then, after the synchronization process is performed on the voice information collected by the plurality of voice collection devices, conducting a voice separation and recognition process on the voice information that was collected by the plurality of voice collection devices and synchronized.

2. The method according to claim 1, wherein determining the clock difference between one of the plurality of devices and the remaining of the plurality of devices comprises:
obtaining a clock of each of the plurality of devices; and
obtaining the clock difference between one of the plurality of devices and one of the remaining of the plurality of devices.

3. The method according to claim 1, wherein determining the clock difference between one of the plurality of devices and one of the remaining of the plurality of devices comprises:

a first device sending a test message at a first time point to a second device;

the first device receiving a feedback message at a third time point from the second device, wherein the feedback message comprises a second time point of receiving the test message and a fourth time point of sending the feedback message of the second device; and determining the clock difference between the clock of the first device and the clock of the second device based on the first time point, the second time point, the third time point and the fourth time point;

wherein the first device is one of the plurality of devices, and the second device is one of the remaining of the plurality of devices.

4. The method according to claim 1, wherein synchronizing the voice information collected by the plurality of voice collection devices comprises:

synchronizing a first voice information based on a clock difference between a first device and a reference device;

wherein the first voice information is collected by a first voice collection device configured on the first device;

the reference device is one of the plurality of devices, and the first device is one of the remaining of the plurality of devices.

5. The method according to claim 1, further comprising: transmitting a collection of information to start a collection of voice information by the plurality of voice collection devices.

6. A method for voice recognition, comprising:

obtaining a clock difference among a plurality of devices connected together, where each of the plurality of devices is configured with a voice collection device;

obtaining voice information collected by the voice collection devices configured on the each of the plurality of devices;

synchronizing the voice information, wherein the synchronization is conducted on a reference clock that is different from clocks the plurality of devices; and then after synchronizing the voice information, conducting a voice separation and recognition process on the voice information that was collected by the plurality of voice collection devices and synchronized based on the clock difference.

7. The method according to claim 6, wherein obtaining the clock difference comprises:

obtaining a first time point for sending a test message by a first device;

obtaining a second time point for receiving the test message by a second device;

obtaining a third time point for receiving a feedback message by the first device;

obtaining a fourth time point for sending the feedback message by the second device; and determining the clock difference between a clock of the first device and a clock of the second device based on the first time point, the second time point, the third time point and the fourth time point;

wherein the first device is one of the plurality of devices, and the second device is one of the remaining of the plurality of devices.

8. The method of claim 6, wherein conducting the voice separation and recognition process on the voice information collected by the plurality of voice collection devices comprises:

synchronizing the voice information collected by the voice collection devices configured on each of the plurality of devices based on the clock difference among the plurality of devices;

separating the synchronized voice information; and recognizing the separated voice information.

9. The method of claim 6, wherein the reference clock is different than the clocks of all of the plurality of devices.

10. The method of claim 6, wherein the reference clock is a standard time of a time zone.

11. The method of claim 10, wherein the plurality of devices are positioned within a vehicle, and wherein the standard time is based on a location of the vehicle.

12. A voice recognizing device, comprising:

a processor, configured to:

obtain a clock difference among a plurality of devices connected together, where each of the plurality of devices is configured with a voice collection device;

obtain voice information collected by the voice collection device configured on the each of the plurality of voice collection devices;

carry out a synchronization process on the voice information, the synchronization process conducted on a reference clock that is different than clocks of all of the plurality of voice collection devices; and then after carrying out the synchronization process on the voice information, conduct a voice separation and recognition process on the voice information that was collected by the voice collection device and synchronized based on the clock difference among the plurality of devices.

13. The device according to claim 12, wherein the processor determines the clock difference comprises:

obtaining a first time point at which a first voice collecting device sends a test message to a second device;

obtaining a second time point at which the second device receives the test message;

obtaining a third time point at which the first voice collecting device receives a feedback message from the second device;

obtaining a fourth time point at which the second device sends the feedback message; and determining the clock difference between a clock of the first device and a clock of the second device based on the first time point, the second time point, the third time point and the fourth time point;

wherein the first device is one of the plurality of devices, and the second device is one of the remaining of the plurality of devices.

14. The device according to claim 12, wherein the processor conducts a voice separation and recognition process comprises:

synchronizing the voice information collected by the voice collection device configured on each of the plurality of devices based on the clock difference among the plurality of devices;

separating the synchronized voice information; and recognizing the separated voice information.

15. The device according to claim 12, further comprises a voice collection circuitry configured to collect the voice information.

16. The device according to claim 12, further comprises a connection circuitry configured to connect with a device through WIFI, Bluetooth or Infrared light.

* * * * *